US006233167B1

(12) United States Patent
Chen et al.

(10) Patent No.: US 6,233,167 B1
(45) Date of Patent: May 15, 2001

(54) POWER-TRANSFORMING DEVICE

(75) Inventors: Chun-Chen Chen; Ming-Che Ho, both of Taoyuan (TW)

(73) Assignee: Delta Electronics, Inc. (TW)

( * ) Notice: Subject to any disclaimer, the term of this patent is extended or adjusted under 35 U.S.C. 154(b) by 0 days.

(21) Appl. No.: 09/389,153

(22) Filed: Sep. 2, 1999

(30) Foreign Application Priority Data

Jul. 4, 1999 (TW) ........................................ 88205340

(51) Int. Cl.[7] .............................................. H02M 1/00

(52) U.S. Cl. .............................................. 363/146; 439/172

(58) Field of Search .............................. 363/146; 439/266, 439/270, 131, 172, 174, 171; 320/111–115

(56) References Cited

U.S. PATENT DOCUMENTS 5,701,244 * 12/1997 Emmert et al. ....................... 363/146
5,923,147 * 7/1999 Martensson .......................... 363/146

* cited by examiner

*Primary Examiner*—Peter S. Wong
*Assistant Examiner*—Gary L. Laxton
(74) *Attorney, Agent, or Firm*—Rosenman & Colin, LLP

(57) ABSTRACT

A power-transforming device including a power-transforming body for transforming an input power into a transformed power and an output port extractably mounted in the power-transforming body for outputting the transformed power is provided. Because the electric wires and plugs of the power-transforming device can be extracted from the power-transforming body and be collected separately, the power-transforming device is very convenient to be carried and used.

22 Claims, 8 Drawing Sheets

POWER-TRANSFORMING DEVICE

FIELD OF THE INVENTION

The present invention is related to a power-transforming device, and especially to an adapter. The power-transforming device of the present invention is very convenient to be carried because the electric wires and plugs can be extracted from the power-transforming body and be collected separately.

BACKGROUND OF THE INVENTION

The power-transforming devices, especially adapters, are generally used in many kinds of machines and electric apparatuses, such as the radios, CD players, printers, and notebook computers. They need adapters to transform AC input powers into appropriate DC output powers having different voltages to fit their different uses. FIG. 1 is a conventional adapter having an adapter body 11, an electric wire 12, a DC plug 13, and an AC plug 14. The AC power inputted from the AC plug 14 is transformed into a DC power in the adapter body 11, and the DC power is outputted from the DC plug 13 through the electric wire 12 into machines and electric apparatuses. FIG. 2 is another conventional adapter which is often used in a notebook computer. The adapter body 22 is still used for transforming an AC input power into a DC output power, and the DC power is still outputted from the DC plug 24 through the electric wire 23 into the notebook computer. Differently, the AC plug 21 is extractably mounted in a jack 25 of the adapter body. When the adapter is not in use, the AC plug 21 can be pulled out of the jack 25, but the AC plug 21 is connected to jack 25 only when the adapter is in use. Because the AC plug can be extracted from the adapter, this adapter is more convenient to be packed up and carried. This advantage is especially important to the notebook computer.

However, these two conventional adapters still have many limitations and disadvantages as follows:

1. The DC plug is connected to the adapter body so that the adapter is not truly convenient to be carried.
2. The electric wire is connected to the adapter body so that it is not easy to coil up the wire.
3. Because the forms of the AC and DC plugs have to be altered with different power-consuming and power-supplying systems and the plugs are connected to the adapter bodies, the adapter bodies have to be changed accordingly while the systems are changed. Therefore, not only is the using efficiency of the adapter bodies dropped but the production cost of the assembled system is increased.

SUMMARY OF THE INVENTION

It is therefore an object of the present invention to provide a novel power-transforming device such that the aforementioned limitations and difficulties encountered by the prior art can be overcome.

It is another object of the present invention to provide a novel power-transforming device which is very convenient to be carried.

It is a further object of the present invention to provide a novel power-transforming device having electric wires which can be collected and coiled up easily.

It is a further object of the present invention to provide a novel power-transforming device which can effectively increase the using efficiency of the power-transforming body.

In a preferred embodiment of the present invention, the power-transforming device of the present invention includes a power-transforming body for transforming an input power into a transformed power, and an output port electrically connected to and extractably mounted in the power-transforming body for outputting the transformed power.

Specifically, the power-transforming device is an adapter, the input power is an AC power, the transformed power is a DC power, and the output port is a DC plug.

According to the present invention, the power-transforming body further includes a driving element connected to connected to the output port for being exerted a force thereon, thereby extracting the output port partly out of the power-transforming body when the power-transforming device is in use, and returning the output port back to the power-transforming body when the power-transforming device is not in use. Preferably, the driving element is mounted on a side surface or an upper surface of the power-transforming body.

According to the present invention, the power-transforming body further includes a first coupling element, a first conducting port mounted on a side surface thereof. In addition, the power-transforming device further includes a wire-collection body detachably connected to the side surface of the power-transforming body. The wire-collection body includes a second conducting port mounted on a side surface thereof and electrically connected to the first conducting port of the power-transforming body for receiving the transformed power from the power-transforming body when the wire-collection body is attached to the power-transforming body, a second coupling element mounted on the surface thereof for being engaged with the first coupling element of the power-transforming body, an output port extractably mounted therein for outputting the transformed power from the power-transforming body, and a coil of wire having one end electrically connected to the second conducting port and the other end electrically connected to the output port for transmitting the transformed power from the second conducting port to the output port.

Preferably, both of the first conducting port and the second conducting port are elastic pieces. The wire-collection body is attached to the side surface of the power-transforming body through an engagement of the first coupling element and the second coupling element when the power-transforming device is in use, and the wire-collection device can be detached from the power-transforming body when the power-transforming device is not in use. The output port of the wire-collection body is extracted out of the wire-collection body when the power-transforming device is in use, and returned to the wire-collection body when the power-transforming device is not in use. In addition, the wire-collection body may further include a locking hole for locking the output port thereof when the power-transforming device is not in use.

According to the present invention, the power-transforming device further includes a transforming joint detachably connected to the side of the power-transforming body. The transforming joint includes a third conducting port mounted on a side surface thereof and electrically connected to the first conducting port of the power-transforming body for receiving the transformed power from the power-transforming body when the transforming joint is attached to the power-transforming body, a third coupling element mounted on the side surface thereof for being engaged with the coupling element of the power-transforming body, and an output port electrically connected to the third conducting element for outputting the transformed power from the power-transforming body. Preferably, the output port of the transforming joint is a D-type connector.

In another preferred embodiment of the present invention, the power-transforming device includes a power-transforming body for transforming an input power into a transformed power, an output port electrically connected to and extractably mounted in the power-transforming body for outputting the transformed power, and a driving element mounted on a surface of the power-transforming body and connected to the output port for being exerted a force thereon, thereby extracting the output port partly out of the power-transforming body when the power-transforming device is in use, and returning the output port back to the power-transforming body when the power-transforming device is not in use.

In a further preferred embodiment of the present invention, the power-transforming device includes a power-transforming body having a first conducting port for transforming an input power into a transformed power, and a wire-collection body detachably connected to the power-transforming body having a second conducting port electrically connected to the first conducting port for receiving the transformed power from the power-transforming body and an output port extractably mounted therein for outputting the transformed power, wherein the output port is extracted out of the wire-collection body when the power-transforming device is in use, and returned to the wire-collection body when the power-transforming device is not in use. The wire-collection body may further include a coil of wire having one end electrically connected to the second conducting port and the other end electrically connected to the output port for transmitting the transformed power from the second conducting port to the output port.

In a further preferred embodiment of the present invention, the power-transforming device includes a power-transforming body having a first conducting port for transforming an input power into a transformed power, and a transforming joint detachably connected to the power-transforming body and having a second conducting port electrically connected to the first conducting port for receiving the transformed power from the power-transforming body when the transforming joint is attached to the power-transforming body and an output port for outputting the transformed power to an input port of a power-consuming system.

The present invention may best be understood through the following description with reference to the accompanying drawings, in which:

DETAILED DESCRIPTION OF THE PREFERRED EMBODIMENTS

Figure 1:
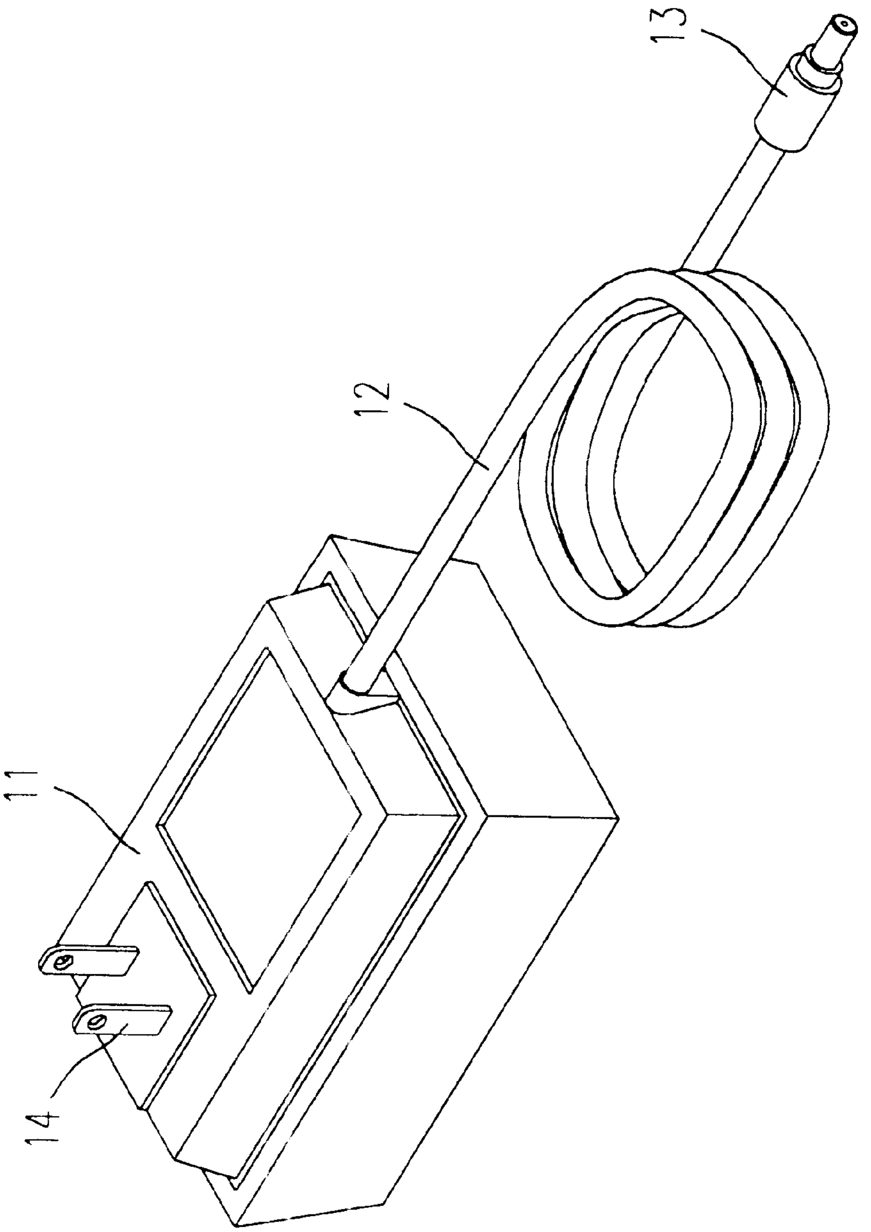
Fig. 1 (PRIOR ART)
FIG. 1 is a schematic diagram showing a conventional power-transforming device.
Figure 2:
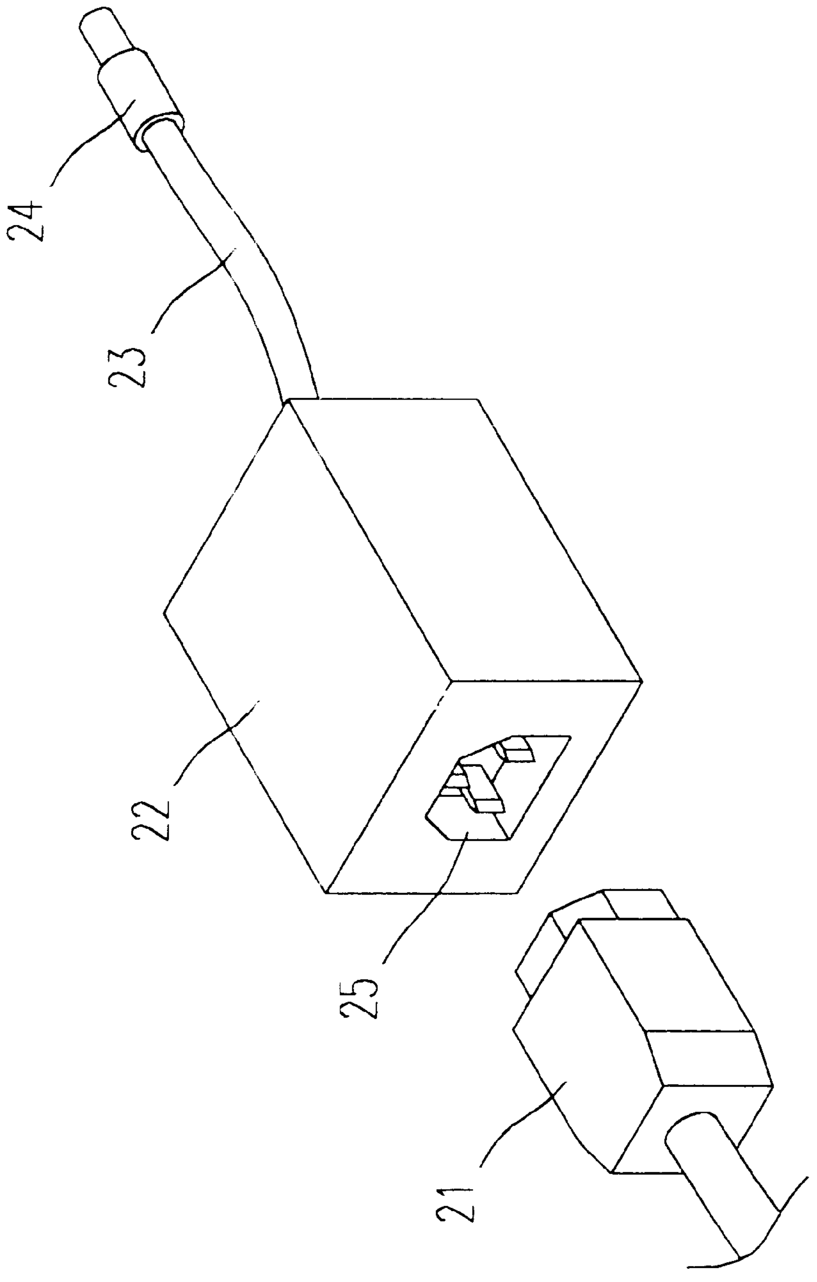
Fig. 2(PRIOR ART)
FIG. 2 is another schematic diagram showing another conventional power-transforming device.
Figure 3:
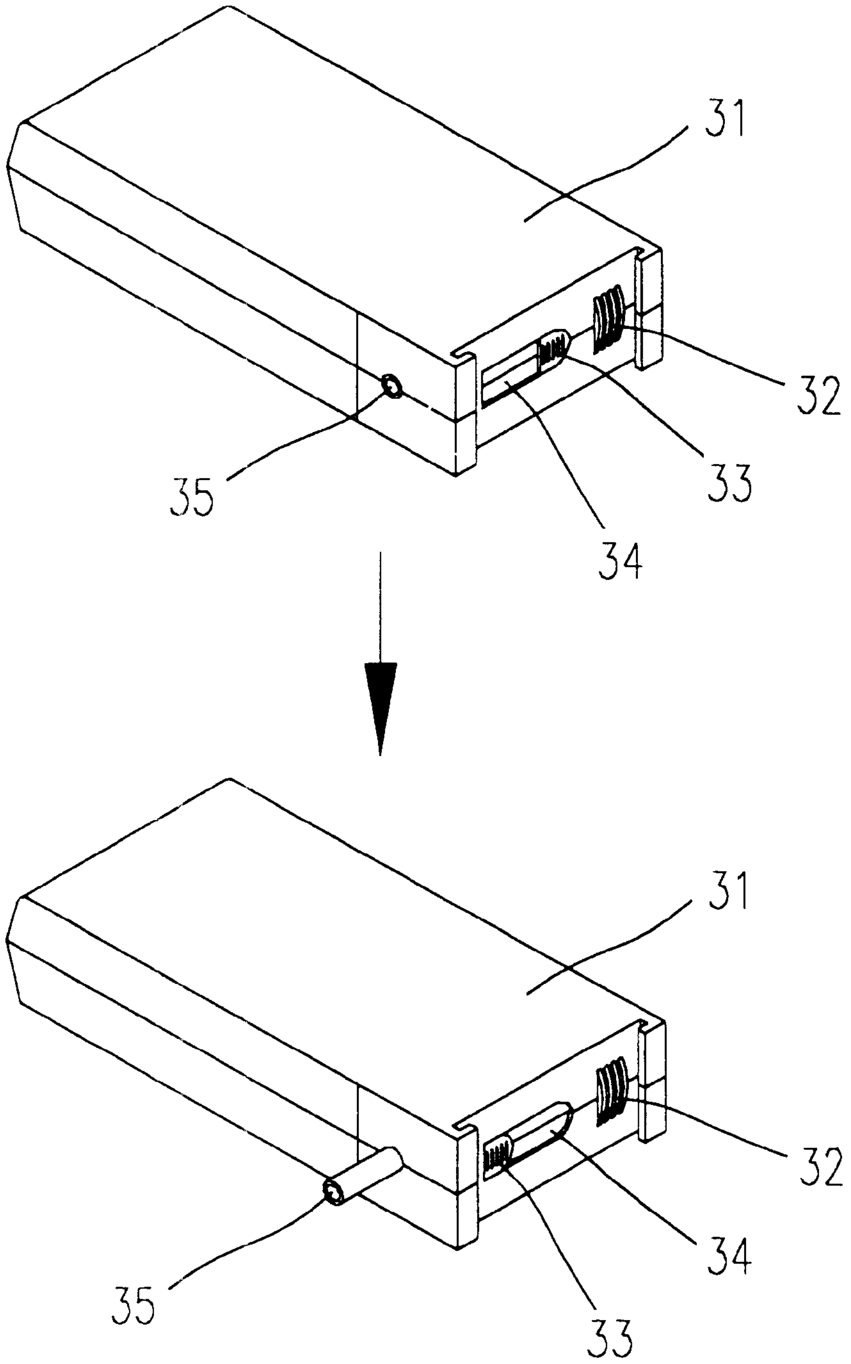
FIG. 3 is a schematic diagram showing the first preferred embodiment of the power-transforming device according to the present invention.

FIG. 3 shows a first preferred embodiment of the power-transforming device of the present invention. The power-transforming device includes a power-transforming body 31 for transforming an input power into a transformed power and an first output port 35 extractably mounted in the power-transforming body 31 for outputting the transformed power. When the power-transforming device is in use, the first output port 35 can be extracted from the power-transforming body 31, and returned it back to the body 31 when the power-transforming device is not in use. The most usual power-transforming device in our daily life is an adapter, and the input power and the transformed power are a family AC power and a DC power respectively. Therefore, the first output port 35 is preferably a DC plug. (The input power is inputted into the power-transforming body 31 through an input port, but the input port is not shown in the figures of the present invention.)

As shown in FIG. 3, the power-transforming device further includes a driving element 33 mounted on a side surface of the power transforming body. While a force is exerted on the driving element 33, the driving element 33 will be slid inside a channel 34 so that the first output port 35 can be extracted out of and returned into the power-transforming body 31.

Figure 4:
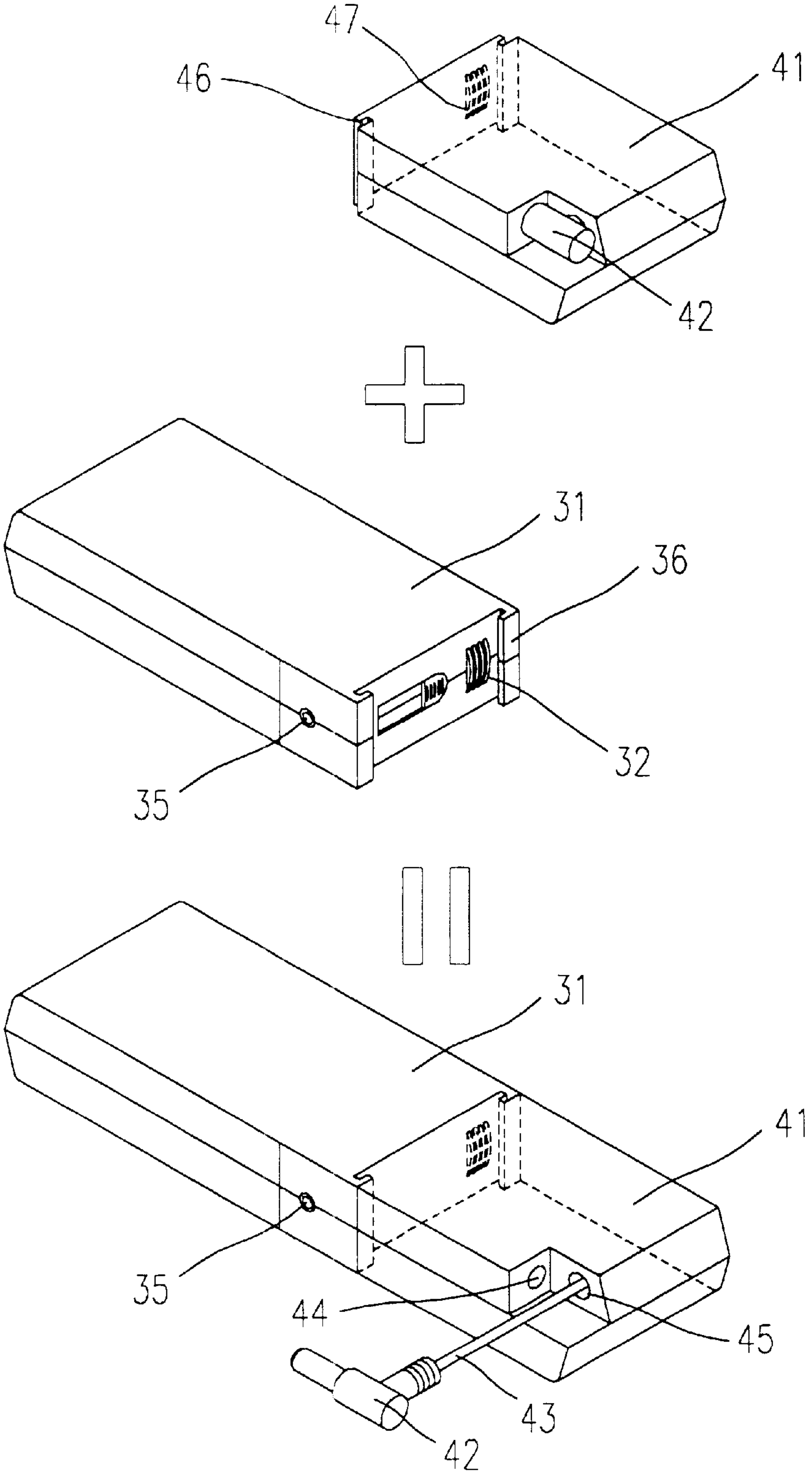
FIG. 4 is a schematic diagram showing the second preferred embodiment of the power-transforming device according to the present invention.

Moreover, the power-transforming device can be attached with a wire-collection body 41 for collecting therein a coil of wire 43 so that the transformed power can be transmitted to a power-consuming system in a long distance. As shown in FIG. 4, the power-transforming body 31 is engaged with the wire-collection body 41 by the first coupling element 36 of the power-transforming body 31 and the second coupling element 46 of the wire-collection body 41. Therefore, the first conducting port 32 on the side surface of the power-transforming body 31 can be connected to the second conducting port 47 of the wire-collection body 41 for transmitting the transformed power.

In addition, one end of the coil of wire inside the wire-collection body 41 is electrically connected to the second conducting port 47 and the other end of wire is electrically connected to a second output port 42. When the power-transforming device is not in use, the coil of wire 43 can be collected in the wire-collection body 41 having the second output port 42 locked in the locking hole 44 so that the disadvantage of collecting wires in the conventional power-transforming device is overcome. When the power-transforrning device is in use, the second output port 42 can be easily pulled out of the wire-collection body 41 from the wire hole 45. By the way, when the second output port 42 is in use, the first output port 35 can be hidden inside the power-transforming body.

Figure 5:
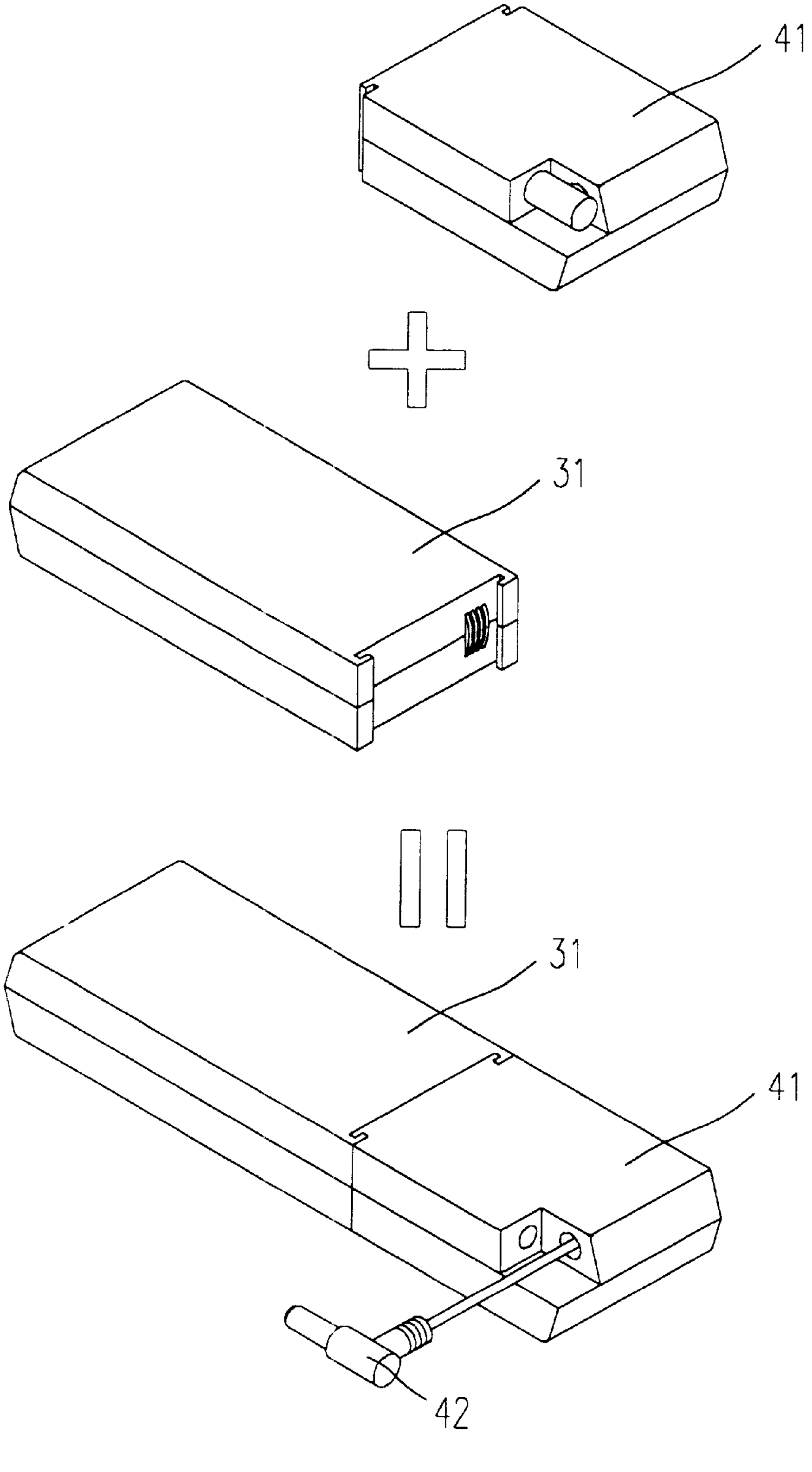
FIG. 5 is a schematic diagram showing the third preferred embodiment of the power-transforming device according to the present invention.

FIG. 5 shows the third preferred embodiment of the power-transforming device of the present invention. The difference between the power-transforming device in FIG. 5 and that in FIG. 4 is that the power-transforming body 31 in FIG. 5 does not include a first output port 35.

Figure 6:
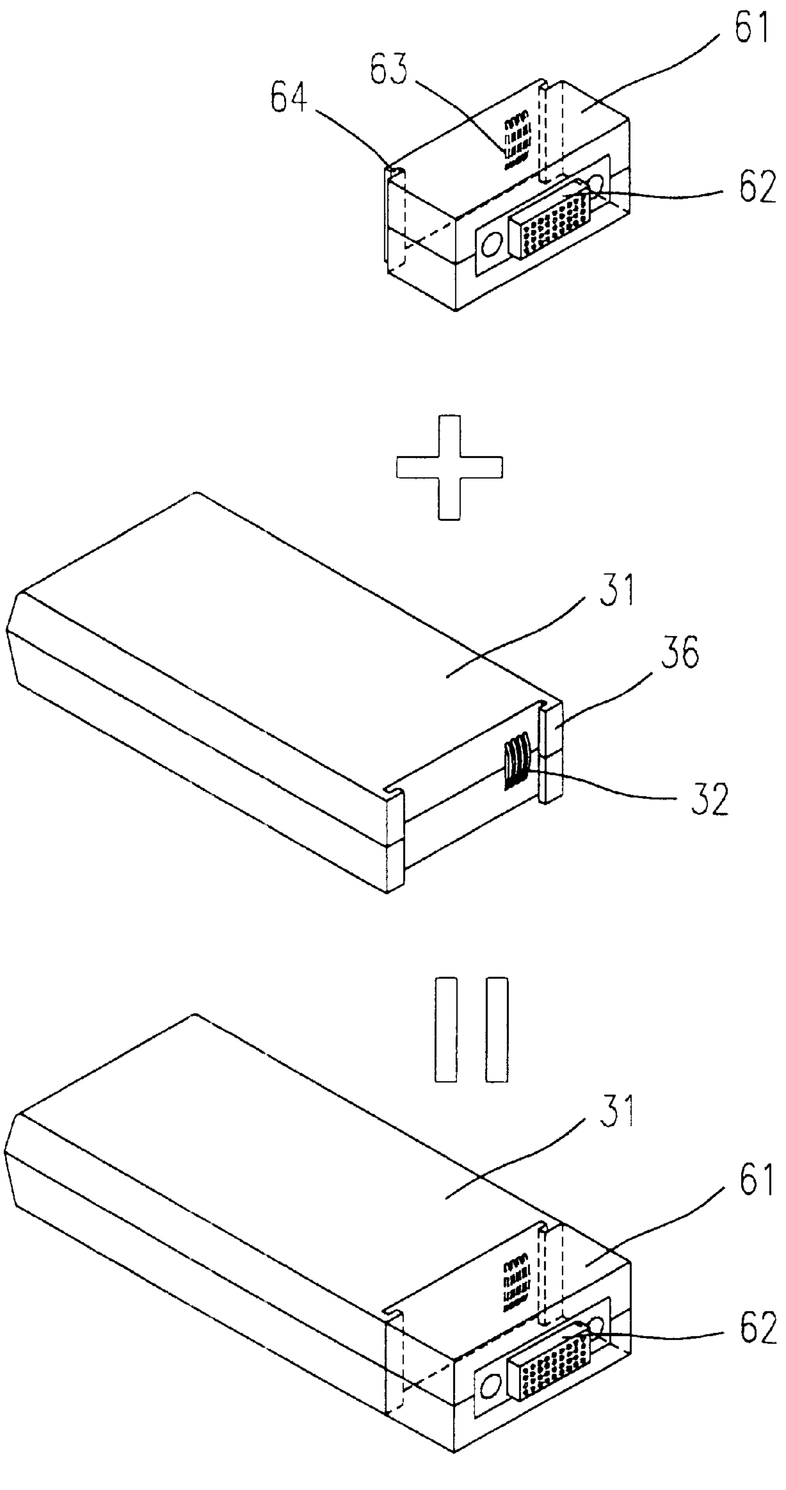
FIG. 6 is a schematic diagram showing the fourth preferred embodiment of the power-transforming device according to the present invention.

FIG. 6 shows the fourth preferred embodiment of the power-transforming device of the present invention. Compared with the power-transforming devices in FIGS. 4 and 5, the wire-collection body 41 is changed to a transforming joint 61 having a D-type connector 62 as an output port. Of course, the transforming joint 61 also includes a third conducting port 63 for receiving the transformed power from the first conducting port 32 when the transforming joint 61 is attached to the power-transforming body 31, and a third coupling element 64 for being engaged with the first coupling element 36.

The output port 62 of the transforming joint 61 is not limited to be a D-type connector. It can be changed according to the different demands of the power-consuming systems. Therefore, when the power-consuming system changes, only the transforming joint 61 is changed but the power-transforming body 31 can still be used so that the producing cost of a new power-transforming body 31 can be saved.

In other words, the power-transforming body 31 can be designed to be a standard type. The manufacturers can mass-produce the standard type of power-transforming body and stock them up. For different power-consuming systems, they only need to produce different kinds of transforming joints so as to reduce the cost.

Figure 7:
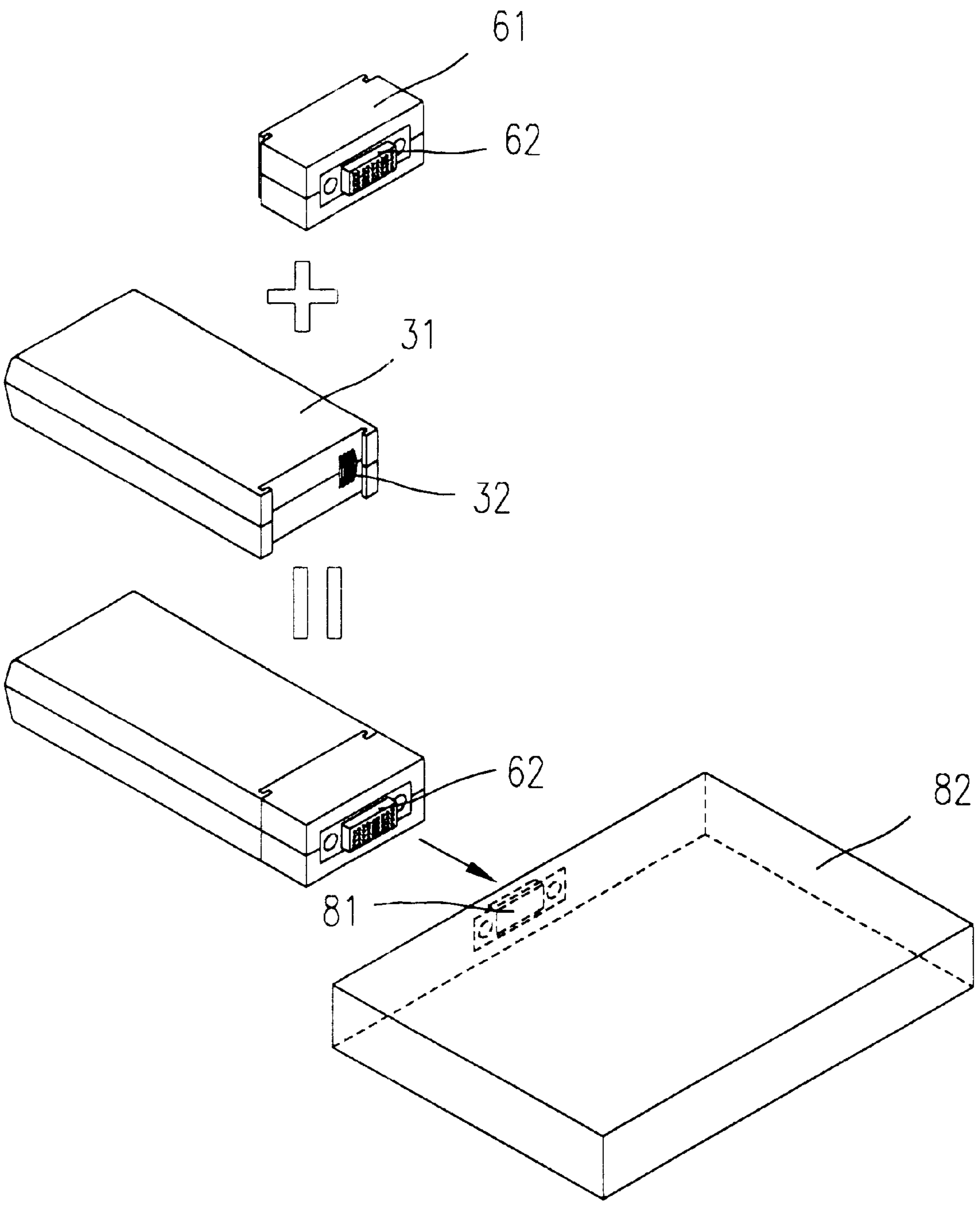
FIG. 7 is a diagram showing how the power-transforming device of the present invention is combined with a power-consuming system.

FIG. 7 is a diagram showing how the power-transforming device in FIG. 6 is combined with a power-consuming system 82. The power-consuming system 82 may be a notebook computer having another D-type connector 81.

Figure 8:
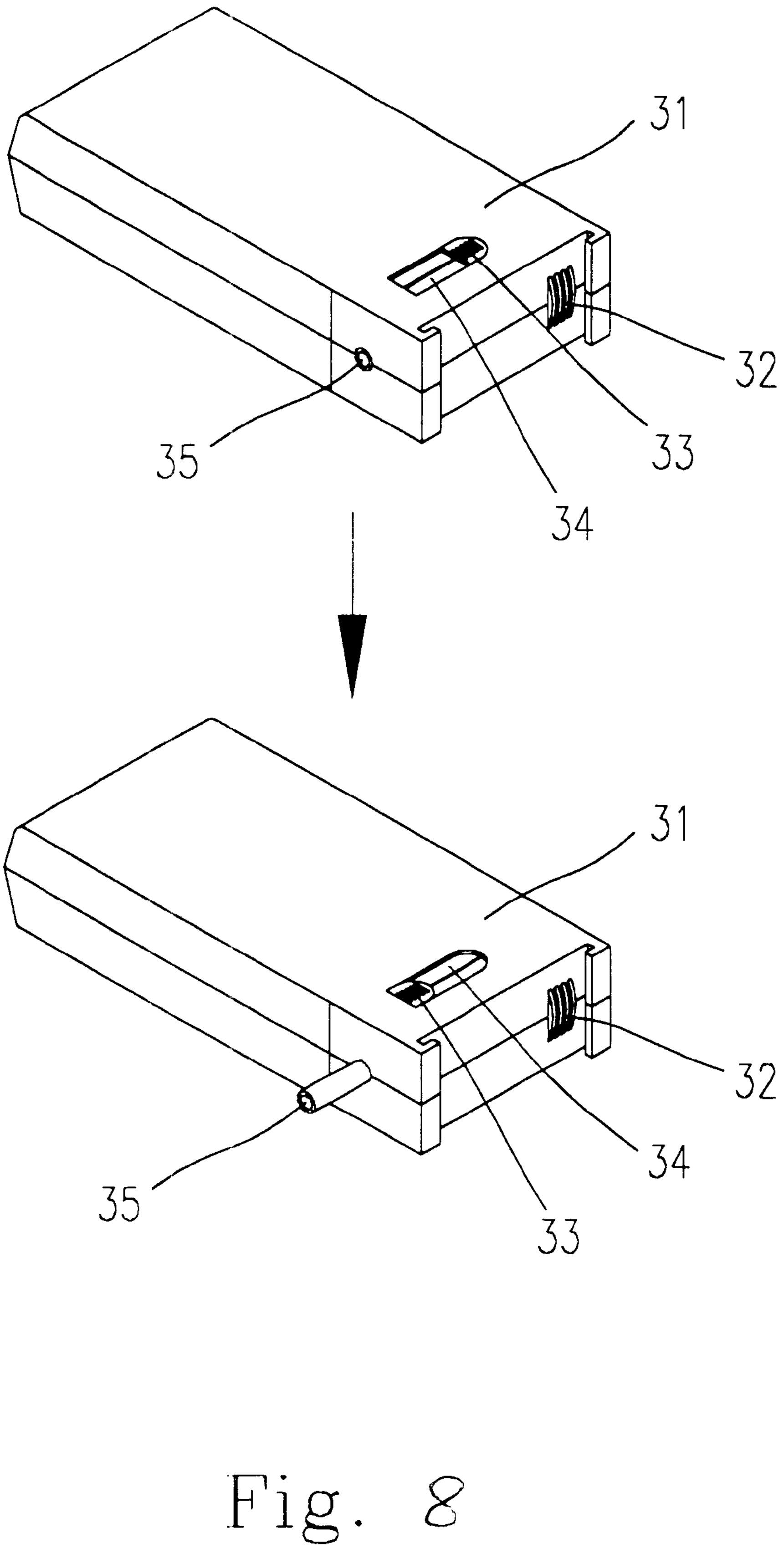
FIG. 8 is a schematic diagram showing the fifth preferred embodiment of the power-transforming device according to the present invention.

As shown in FIG. 8, the driving element 33 of the present invention can also be mounted on an upper surface of the power-transforming body 31. Therefore, when the wire-collection body 41 or the transforming joint 61 is connected to the power-transforming body 31, the first output port 35 can still be extracted out or returned to the power-transforming body 35.

While the invention has been described in terms of what are presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power-transforming device comprising:

a power-transforming body for transforming an input power into a transformed power;

an output port electrically connected to said power-transforming body and extractably mounted in said power-transforming body for outputting said transformed power; and a driving element connected to said output port for extracting said output port partly out of said power-transforming body by an external force when said power-transforming device is in use, and returning said output port back to said power-transforming device when said power-transforming device is not in use.

2. The power-transforming device according to claim 1, wherein said power-transforming device is an adapter.

3. The power-transforming device according to claim 1, wherein said input power is an AC power.

4. The power-transforming device according to claim 1, wherein said transformed power is a DC power.

5. The power-transforming device according to claim 1, wherein said output port is a plug.

6. The power-transforming device according to claim 5, wherein said plug is a DC plug.

7. The power-transforming device according to claim 1, wherein said driving element is mounted on a side surface of said power-transforming body.

8. The power-transforming device according to claim 1, wherein said driving element is mounted on an upper surface of said power-transforming body.

9. The power-transforming device according to claim 1, wherein said power-transforming body further includes a first coupling element and a first conducting port mounted on a side surface thereof.

10. The power-transforming device according to claim 9, wherein said power-transforming device further includes a wire-collection body detachably connected to said side surface of said power-transforming body.

11. The power-transforming device according to claim 10, wherein said wire-collection body includes:

a second conducting port mounted on a side surface thereof and electrically connected to said first conducting port of said power-transforming body for receiving said transformed power from said power-transforming body when said wire-collection body is attached to said power-transforming body;

a second coupling element mounted on said side surface thereof for being engaged with said first coupling element of said power-transforming body;

an output port extractably mounted therein for outputting said transformed power from said power-transforming body; and a coil of wire having one end electrically connected to said second conducting port and the other end electrically connected to said output port for transforming said transformed power from said second conducting port to said output port.

12. The power-transforming device according to claim 11, wherein both of said first conducting port and said second conducting port are elastic pieces.

13. The power-transforming device according to claim 11, wherein said wire-collection body is attached to said side surface of said power-transforming body through an engagement of said first coupling element and said second coupling element when said power-transforming device is in use, and said wire-collection device can be detached from said power-transforming body when said power-transforming device is not in use.

14. The power-transforming device according to claim 13, wherein said output port of said wire-collection body is extracted out of said wire-collection body when said power-transforming device is in use, and returned to said wire-collection body when said power-transforming device is not in use.

15. The power-transforming device according to claim 14, wherein said wire-collection body further includes a locking hole for locking said output port when said power-transforming device is not in use.

16. The power-transforming device according to claim 9, wherein said power-transforming device further includes a transforming joint detachably connected to said side surface of said power-transforming body.

17. The power-transforming device according to claim 16, wherein said transforming joint includes:

a third conducting port mounted on a side surface thereof and electrically connected to said first conducting port of said power-transforming body for receiving said transformed power from said power-transforming body when said transforming joint is attached to said power-transforming body;

a third coupling element mounted on said side surface thereof for being engaged with said first coupling element of said power-transforming body; and an output port electrically connected to said third conducting element for outputting said transformed power from said power-transforming body.

18. The power-transforming device according to claim 17, wherein said output port of said transforming joint is a D-type connector.

19. A power-transforming device comprising:

a power-transforming body for transforming an input power into a transformed power;

an output port electrically connected to said power-transforming body for outputting said transformed power; and a driving element mounted on a surface of said power-transforming body and connected to said output port for extracting said output port partly out of said power-transforming body by an external force when said power-transforming device is in use, and returning said output port back to said power-transforming body when said power-transforming device is not in use.

20. A power-transforming device comprising:

a power-transforming body having a first conducting port and transforming an input power into a transformed power; and a wire-collection body detachably connected to said power-transforming body, having a second conducting port electrically connected to said first conducting port for receiving said transformed power from said power-transforming body when said wire-collection body is attached to said power-transforming body, and an output port extractably mounted therein for outputting said transformed power;

wherein said output is extracted out of said wire-collection body when said power-transforming device is in use, and returned to said wire-collection body when said power-transforming device is not in use.

21. The power-transforming device according to claim 19, wherein said wire-collection body further includes a coil of wire having one end electrically connected to said second conducting port and the other end electrically connected to said output port for transmitting said transformed power from said second conducting port to said output port.

22. A power-transforming device comprising:

a power-transforming body having a first conducting port and transforming an input power into a transformed power; and transforming joint electrically connected to said power-transforming body, having a second conducting port electrically connected to said first conducting port of said power-transforming body for receiving said transformed power from said power-transforming body when said transformed joint is attached to said power-transforming body, and an output port for outputting said transformed power to an input port of a power-consuming system.

* * * * *